United States Patent
Takahashi (10) Patent No.: US 8,027,554 B2
(45) Date of Patent: Sep. 27, 2011

(54) THERMO-OPTIC PHASE SHIFTER AND METHOD FOR MANUFACTURING SAME

(75) Inventor: Morio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 296 days.

(21) Appl. No.: 12/443,319

(22) PCT Filed: Oct. 10, 2007

(86) PCT No.: PCT/JP2007/069715
§ 371 (c)(1),
(2), (4) Date: Mar. 27, 2009

(87) PCT Pub. No.: WO2008/047634
PCT Pub. Date: Apr. 24, 2008

(65) Prior Publication Data
US 2009/0297092 A1  Dec. 3, 2009

(30) Foreign Application Priority Data
Oct. 20, 2006  (JP) ................................. 2006-286756

(51) Int. Cl.
*G02B 6/12* (2006.01)
*H01L 21/00* (2006.01)
*G02F 1/01* (2006.01)
*B05D 5/06* (2006.01)
*C23C 16/513* (2006.01)
*C23C 14/34* (2006.01)
*C23F 1/00* (2006.01)

(52) U.S. Cl. .................. 385/14; 385/1; 385/2; 385/131; 438/31; 427/163.2; 427/569; 204/192.1; 216/24

(58) Field of Classification Search .................. 385/1, 2, 385/3, 14, 8, 129, 130, 131, 132, 141; 438/29, 438/31, 42; 427/163.2, 569; 204/192.1; 216/24

See application file for complete search history.

(56) References Cited

U.S. PATENT DOCUMENTS
6,370,307 B1 * 4/2002 Bruce et al. .................. 385/130
7,333,679 B2 * 2/2008 Takahashi ........................ 385/1
(Continued)

FOREIGN PATENT DOCUMENTS
JP  1987187826 A  8/1987
(Continued)

OTHER PUBLICATIONS
International Search Report for PCT/JP2007/069715 mailed Nov. 13, 2007.
(Continued)

*Primary Examiner* — Brian Healy (57) ABSTRACT

The thermo-optic phase shifter (200) according to an exemplary aspect of the invention includes: a substrate (201); a sacrificial layer (202) formed above the substrate (201); a first cladding layer (203) formed above the sacrificial layer (202) and having a film density higher than that of the sacrificial layer (202); an optical waveguide core (204) formed above the first cladding layer (203); a second cladding layer (205) provided over the first cladding layer (203) to cover the optical waveguide core (204); a heat-generating heater (206) provided to a region of the second cladding layer (205) directly above the optical waveguide core (204); and a groove (207) formed in a side face region of the optical waveguide core (204) and extending from the surface of the second cladding layer (205) to the surface of the substrate (201).

8 Claims, 8 Drawing Sheets

U.S. PATENT DOCUMENTS

| | | | |
|---|---|---|---|
| 2003/0031445 A1* | 2/2003 | Parhami et al. | 385/129 |
| 2003/0090775 A1* | 5/2003 | Webb et al. | 359/279 |
| 2005/0169566 A1* | 8/2005 | Takahashi | 385/1 |
| 2009/0297092 A1* | 12/2009 | Takahashi | 385/14 |

FOREIGN PATENT DOCUMENTS

| | | |
|---|---|---|
| JP | 1997005653 A | 1/1997 |
| JP | 3152182 B | 4/2001 |
| JP | 2001255474 A | 9/2001 |
| JP | 2003513328 A | 4/2003 |
| JP | 2003287641 A | 10/2003 |
| JP | 2004037524 A | 2/2004 |

OTHER PUBLICATIONS

T. Kanie et al. "PLC Type 2×2 Optical Switched Array", Proceedings of the IEICE General Conference. C-3-8, p. 140, 2002.

* cited by examiner

THERMO-OPTIC PHASE SHIFTER AND METHOD FOR MANUFACTURING SAME

This application is the National Phase of PCT/JP2007/069715, filed Oct. 10, 2007, which is based upon and claims priority from Japanese Patent Application No. 2006-286756 filed Oct. 20, 2006.

TECHNICAL FIELD

The present invention relates to a thermo-optic phase shifter and a method for manufacturing the same, and more particularly relates to a thermo-optic phase shifter that can be favorably used as an optical device such as a wavelength filter, a variable attenuator, or a switch that makes use of phase changes produced by thermo-optical effect.

BACKGROUND ART

In the field of optical communication, multi-channel communication is making rapid strides due to the advent of the wavelength division multiplexing (WDM) communication system. Along with this, optical elements are necessary in a quantity corresponding to the number of channels in order to achieve functional control over each channel. Examples of this are keeping the power of each channel consistent, and performing switching.

Accordingly, there is a growing need for small-sized optical circuit components that can be applied to optical switches and other such optical devices. A number of single-unit optical switches have been invented in the past, and matrix switches having a plurality of input/output ports, and in which a large number of these light switches are used, have also seen practical application.

Various techniques have been proposed for obtaining an optical switch. For instance, there is a method in which an input port and an output port are connected by mechanically moving them (see Patent Document 1, for example), a method in which an input port and an output port are connected by rotating a movable mirror to tilt it at a specific angle (see Patent Document 2 and Non-Patent Document 1, for example), a method in which liquid crystals are used (see Patent Document 3, for example), and a method in which the connection between an input port and an output port is changed by controlling the reflection of light by generating bubbles at the intersection point of connected waveguides or another such means. These are just a few of the various methods available.

Among these, a plan light wave circuit (PLC) type of device utilizing a thermo-optic phase shifter can be produced using semiconductor circuit production technology. Accordingly, the device easy to manufacture lends itself extremely well to integration, which is advantageous in terms of improving functionality and increasing scale.

A thermo-optic phase shifter is usually obtained as follows. First, an optical waveguide having a cladding layer and a core is produced on a substrate. A metal thin film or other such conductive thin film is formed on this optical waveguide and worked into a fine line shape along the optical waveguide, so that current can be conducted. When power is supplied to this thin film from the outside, heat is generated by the electric resistance of the thin film, so that the film operates as a heater of the optical waveguide. The heat generated by this heater reaches the core through the cladding layer of the optical waveguide. As a result, the refractive index increases in the portion of the optical waveguide that is heated by the heater. The effective waveguide length increases corresponding to the resulting change in the refractive index and to the waveguide length, and the phase of the light is shifted at the output terminal. The amount of phase shift can be controlled as needed by adjusting the power supplied to the heater. When the optical waveguide is formed from quartz glass, the refractive index temperature coefficient (dn/dT) of the quartz glass is about $1 \times 10^{-5}$ (/° C.).

A light switch can be obtained by dividing a single optical waveguide into two optical waveguides at the input terminal, connecting at least one of the two optical waveguides to the thermo-optic phase shifter, and recombining the two optical waveguides at the output terminal. For example, if the phases of the light guided by the two optical waveguides are mutually shifted by one-half the wavelength, the output at the output terminal can be reduced to zero. Also, if the phases of the two divided optical waveguides are not shifted, the inputted light can be outputted without any modification. This allows on/off control of the output.

However, if a plurality of thermo-optic phase shifters are disposed in a single optical circuit for the sake of multiplexing, power consumption of the overall optical circuit is much higher when each thermo-optic phase shifter consumes a large amount of power. With the thermo-optic phase shifters that have been put to practical use up to now, such as when guiding light with a wavelength of 1550 nm (nanometer), which is normally used for optical communication, the power necessary to shift the phase by one-half the wavelength is about 400 mW (milliwatts) per channel. Therefore, if, for instance, an optical communication circuit with 40 channels is to be controlled, and a switch in which the above-mentioned thermo-optic phase shifter is utilized is provided for every channel, then a maximum power of 40×400 mW (that is, 16,000 mW, or 16 W) will be necessary. A method in which the heat generated by the heater is efficiently utilized has thus been proposed as a first proposal (see Patent Document 4, for example).

Figure 6:
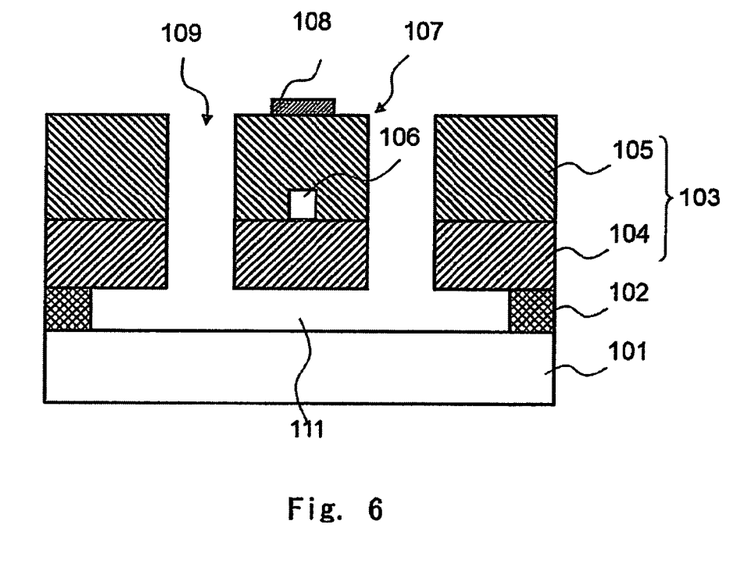
FIG. 6 is a cross section of the main components of the thermo-optic phase shifter pertaining to a conventional first proposal.
Figure 7:
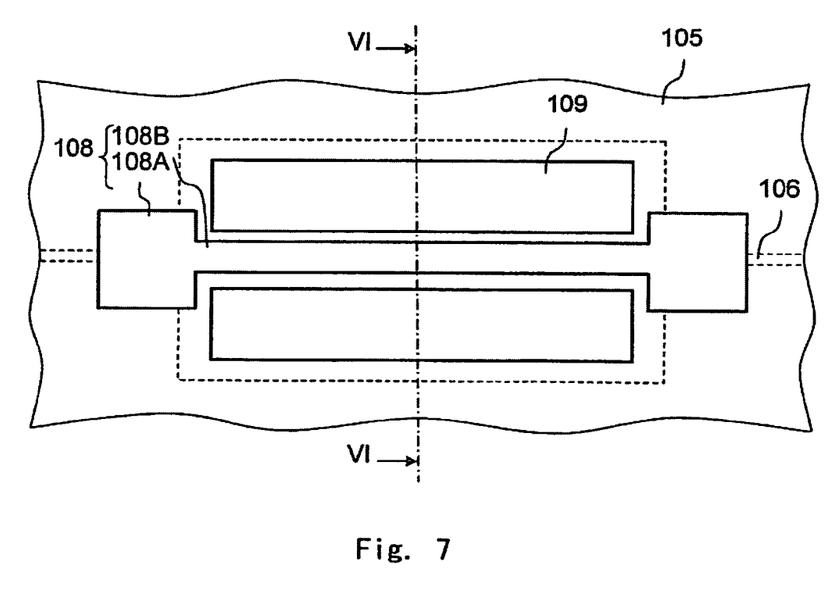
FIG. 7 is a plan view of the thermo-optic phase shifter pertaining to a conventional first proposal.

FIGS. 6 and 7 illustrate the conventional first proposal for efficiently utilizing heat generated by a heater. FIG. 6 is a cross section along the VI-VI line in FIG. 7. As shown in FIG. 6, with the thermo-optic phase shifter pertaining to this first proposal, there is a substrate 101 having a thickness of 0.8 mm and composed of silicon, for example. A sacrificial layer 102 is provided over this substrate 101. The sacrificial layer 102 is formed from phosphorus-added silica glass (PSG) obtained by doping glass with phosphorus, for example, and has a film thickness of 5 µm, for example.

A cladding layer 103 is provided over the sacrificial layer 102. The cladding layer 103 is constituted by a lower cladding layer 104 provided over the sacrificial layer 102, and an upper cladding layer 105 provided over this lower cladding layer 104. The lower cladding layer 104 and upper cladding layer 105 are formed from BPSG (boro-phospho-silicate glass) obtained by doping glass with boron and phosphorus, for example, and have a film thickness of 14 µm and 15 µm, respectively, for example. The substrate 101 may be formed from a semiconductor other than silicon, or from an insulator such as quartz glass. The sacrificial layer 102 is not limited to PSG, and may be formed from any material that has a higher etching rate than the substrate 101 and the cladding layer 103 and can be selectively etched with respect to the substrate 101 and the cladding layer 103, and as long as these conditions are met, may be formed from a semiconductor or a glass other such PSG, for example.

A core 106 that extends parallel to the surface of the substrate 101 is provided over the lower cladding layer 104, and the upper cladding layer 105 is provided so as to cover the core 106. The core 106 and the cladding layer 103 around the core 106 form an optical waveguide 107. The shape of a cross section of the core 106 perpendicular to its lengthwise direction is that of a rectangle with a height of 5.5 μm, and a width of 5.5 μm, for example. The core 106 is formed from a material with a higher refractive index than that of the cladding layer 103, such as GPSG (germanium-phosphorus-added silica glass), and the relative refractive index differential Δ between the core 106 and the cladding layer 103 is 0.65%, for example.

With the thermo-optic phase shifter of this first proposal, a thin-film heater 108 is provided over the optical waveguide 107, that is, on the surface of the upper cladding layer 105. The thin-film heater 108 is a thin film composed of chromium, and its thickness is 0.2 μm, for example. As shown in FIG. 7, the thin-film heater 108 includes electrode portions 108A at both ends, and a heater portion 108B in between the electrode portions 108A. The shape of the electrode portions 108A is square, for example, and the shape of the heater portion 108B is that of a slender wire with a width of 10 μm and a length of 4 mm, for example.

Of the region of the cladding layer 103 and the sacrificial layer 102 that are underneath the thin-film heater 108, grooves 109 extending parallel to the direction in which the core 106 extends are formed in regions located on both sides of the optical waveguide 107. The grooves 109 are formed at two places so as to flank the optical waveguide 107. The length of the grooves 109 in their lengthwise direction, that is, the direction in which the core 106 extends, is 4 mm, for example, the width of the grooves 109, that is, the length in a direction perpendicular to the direction in which the core 106 extends, is 205 μm, for example, and the depth of the grooves 109 is 29 μm, for example. The distance between the grooves 109, that is, the ridge width of the optical waveguide 107 is 25 μm, for example. The sacrificial layer 102 is removed from between the optical waveguide 107 and the substrate 101 to form a gap 111 (FIG. 6). The height of the gap 111 is equal to the film thickness of the sacrificial layer 102, and is 5 μm, for example. Consequently, the optical waveguide 107 is separated from cladding layer 103 other than the optical waveguide 107 and from the sacrificial layer 102 and the substrate 101 by the two grooves 109 and the gap 111, forming a bridge. The sacrificial layer 102 is formed over the entire surface of the substrate 101, except for the gap 111.

Thus, with the thermo-optic phase shifter of the first proposal, from the standpoint of preventing heat generated by the thin-film heater 108 from escaping to the substrate 101 side in order to reduce power consumption, the sacrificial layer 102 located underneath the optical waveguide 107 is removed, and the optical waveguide 107 is given a bridge structure.

Figure 8A:
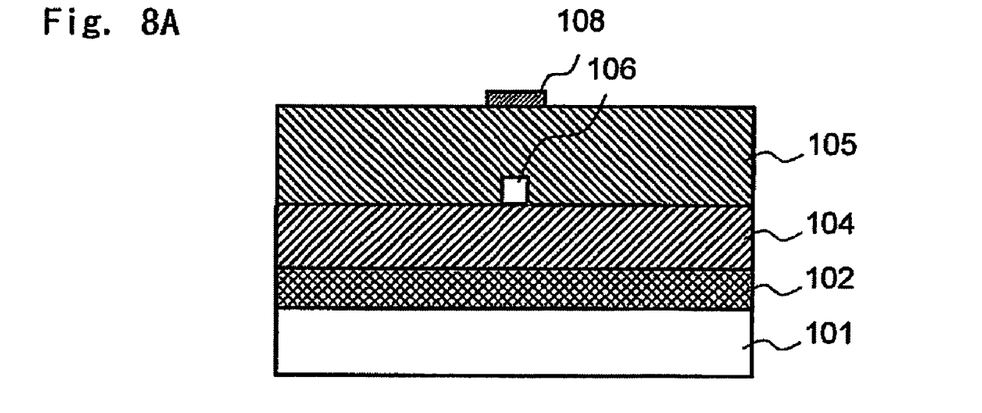
FIG. 8A is a cross section of the main components, illustrating the main points of the process for manufacturing the thermo-optic phase shifter pertaining to a conventional first proposal.

FIGS. 8A to 8C schematically illustrate the method for manufacturing the thermo-optic phase shifter of the first proposal. First, phosphorus-added silica glass (PSG) is formed as the sacrificial layer 102 over the substrate 101 as shown in FIG. 8A, the lower cladding layer 104 is formed over this to dispose the core 106, and the upper cladding layer 105 is formed so as to cover this, to form an optical waveguide. The thin-film heater 108 is formed on the surface of the upper cladding layer 105.

Figure 8B:
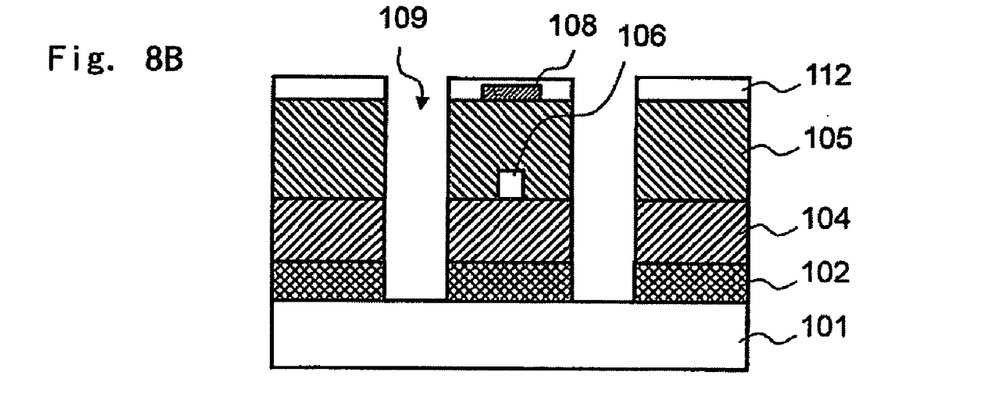
FIG. 8B is a cross section of the main components, illustrating the main points of the process for manufacturing the thermo-optic phase shifter pertaining to a conventional first proposal.

Next, a resist 112 is formed over the thin-film heater 108 as shown in FIG. 8B, and this resist 112 is used as a mask to etch the grooves 109, which extend to the substrate 101 (composed of a silicon thin film), at locations flanking the optical waveguide.

Figure 8C:
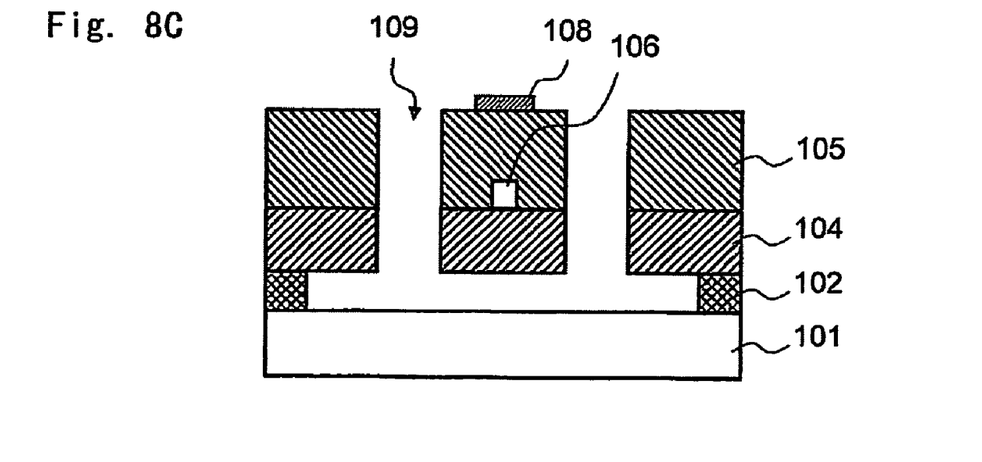
FIG. 8C is a cross section of the main components, illustrating the main points of the process for manufacturing the thermo-optic phase shifter pertaining to a conventional first proposal.

Next, as shown in FIG. 8C, phosphorus-added silica glass (the sacrificial layer 102) is selectively removed by wet etching via the grooves 109 thus formed. Consequently, a thermo-optic phase shifter can be produced in which the sacrificial layer 102 does not remain, and the lower cladding layer 104 is disposed a distance away from and over the substrate 101, on the outside of the grooves 109.

Meanwhile, as a second proposal, there has been proposed a technique in which an optical waveguide is formed by forming overcladding so as to cover a core, a heater is formed over this optical waveguide, and grooves are formed to remove a silicon terrace (see Patent Document 5, for example).

Figure 9A:
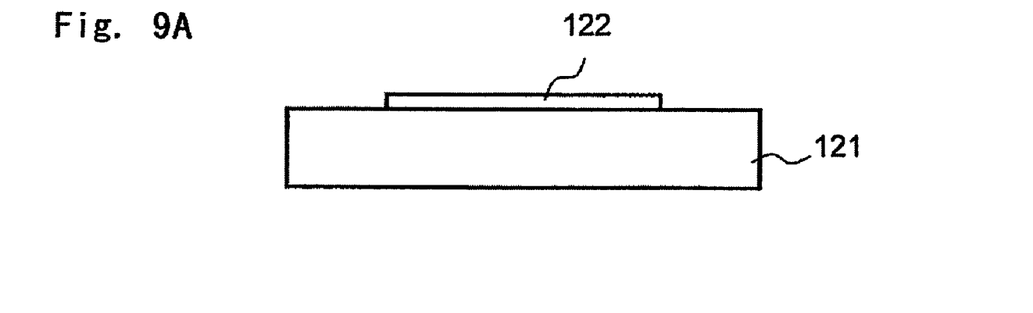
FIG. 9A is a diagram illustrating the main points of the process for manufacturing the glass waveguide pertaining to a conventional second proposal.

FIGS. 9A to 9G schematically illustrate the method for manufacturing the thermo-optic phase shifter of the second proposal. First, as shown in FIG. 9A, a silicon thin film with a thickness of 2.5 μm, for example, is formed (not shown) by sputtering over the entire surface of a quartz substrate 121. This silicon thin film is patterned into a silicon terrace 122 by photolithography.

Figure 9B:
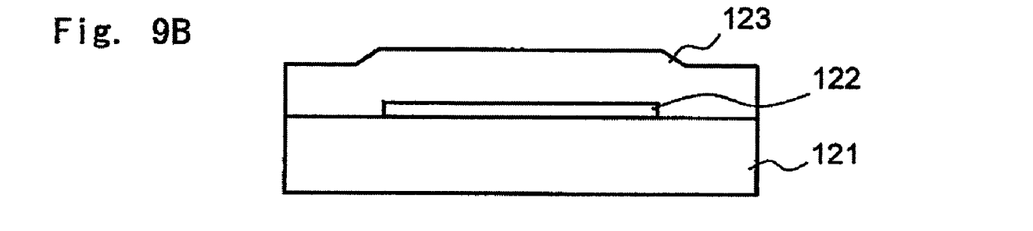
FIG. 9B is a diagram illustrating the main points of the process for manufacturing the glass waveguide pertaining to a conventional second proposal.
Figure 9C:
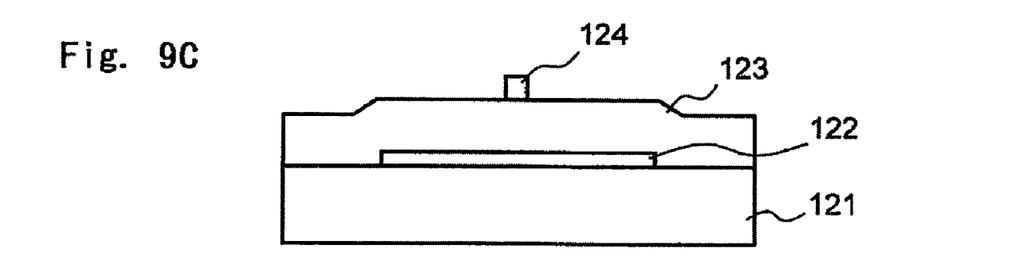
FIG. 9C is a diagram illustrating the main points of the process for manufacturing the glass waveguide pertaining to a conventional second proposal.

Next, as shown in FIG. 9B, undercladding 123 is formed in a thickness of approximately 8 μm by plasma CVD (Chemical Vapor Deposition). Sputtering is then performed to form a core film (not shown) with a thickness of approximately 6 μm, and to which germanium has been added, over the entire surface of the undercladding 123, and as shown in FIG. 9C, a core (optical circuit) 124 is formed by photolithography.

Figure 9D:
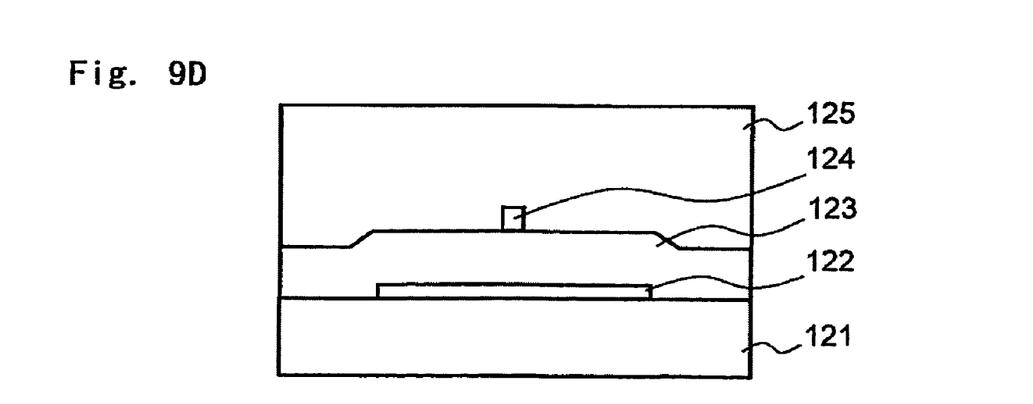
FIG. 9D is a diagram illustrating the main points of the process for manufacturing the glass waveguide pertaining to a conventional second proposal.
Figure 9E:
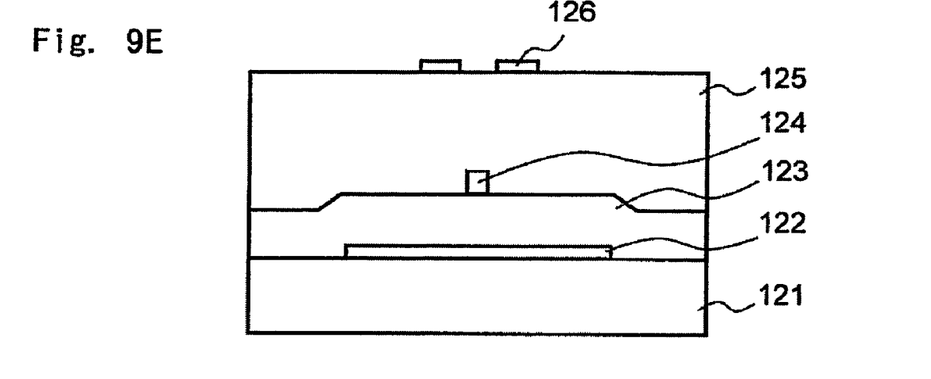
FIG. 9E is a diagram illustrating the main points of the process for manufacturing the glass waveguide pertaining to a conventional second proposal.

After this, as shown in FIG. 9D, overcladding 125 is formed in a thickness of 30 μm by flame deposition. Then, as shown in FIG. 9E, a heater 126 having three layers, namely, a titanium layer with a thickness of approximately 0.1 μm, a platinum layer with a thickness of approximately 0.5 μm, and a gold layer with a thickness of approximately 0.5 μm, is formed by the lift-off method. The gold is removed from the heat-generating region by etching, however, resulting in a two-layer structure of titanium and platinum.

Figure 9F:
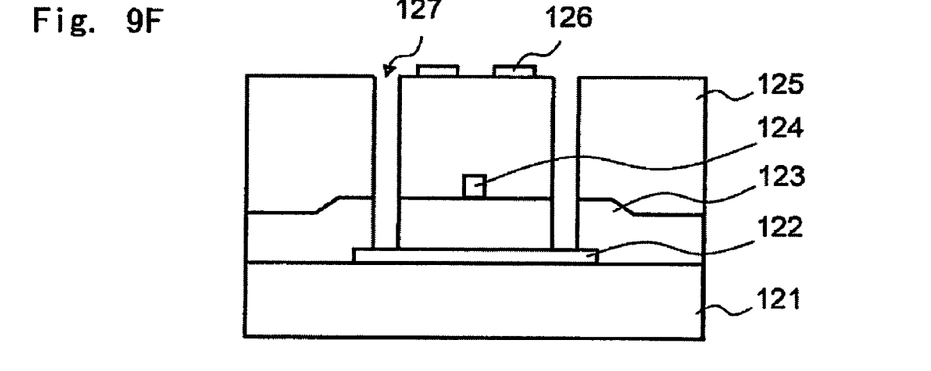
FIG. 9F is a diagram illustrating the main points of the process for manufacturing the glass waveguide pertaining to a conventional second proposal.
Figure 9G:
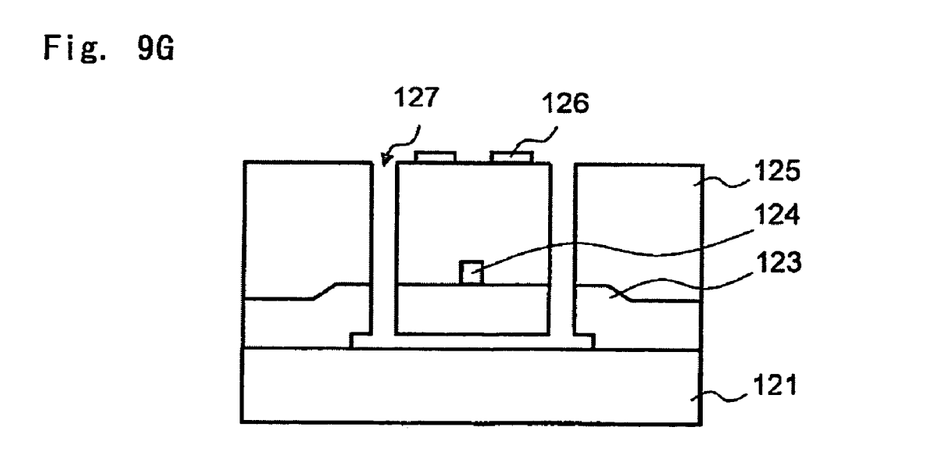
FIG. 9G is a diagram illustrating the main points of the process for manufacturing the glass waveguide pertaining to a conventional second proposal.

Next, as shown in FIG. 9F, pits 127 are formed on both sides of the heater 126. The etching of these pits 127 is continued until they reach the silicon terrace 122. After this, as shown in FIG. 9G, the silicon terrace 122 is completely removed by etching, over the entire length in the lengthwise direction of the glass waveguide element. This product is then divided into individual elements by dicing, and irradiated with an excimer laser to form Bragg grating on the core 124, thereby obtaining a glass waveguide.

Since a gap can be formed between the optical waveguide and the substrate with these first and second proposals, the power consumption of the thermo-optic phase shifter can be reduced.

Patent Document 1: Japanese Unexamined Patent Publication No. H9-5653 (paragraph 0011, FIGS. 1 and 2)
Patent Document 2: Japanese Unexamined Patent Publication No. 2001-255474 (paragraph 0008, FIG. 2)
Patent Document 3: Japanese Unexamined Patent Publication No. S62-187826 (from page 5, lower-right block, line 4, to page 6, upper right block, line 14)
Patent Document 4: Japanese Unexamined Patent Publication No. 2004-37524 (paragraphs 0041 to 0044, paragraphs 0063 to 0065, and FIGS. 1 and 4)
Patent Document 5: Japanese Patent No. 3,152,182 (paragraphs 0024 to 0031, FIG. 2)
Non-Patent Document 1: Proceedings of the IEICE General Conference, C-3-8 (2002), p. 140

DISCLOSURE OF THE INVENTION

Problems to be Solved by the Invention

The problems described below were encountered with the first and second proposals, however. First, with the technique shown as the second proposal in FIGS. 9A to 9G, a problem is the difficulty of selectively etching the silicon thin film. A chemical obtained by mixing nitric acid with a hydrofluoric acid aqueous solution is usually used to etch silicon. This chemical is extremely hazardous, and will also etch away the resist or the silica glass, so it is difficult to etch just the silicon thin film safely and selectively. With the second proposal, undercladding is formed so as to cover a selectively formed silicon thin film. Therefore, a problem is that the top of this undercladding is not flat, making it difficult to form the overcladding and heater layers over this undercladding.

With the second proposal, annealing is carried out at high temperature to increase the density and remove any impurities that would be a source of transmission loss, in order to ensure good reliability and reduce loss. For example, when SiON, which is suited to raising the refractive index, is used as the material for an optical waveguide core, infrared absorption originating in N—H bonds or O—H bonds is present near the infrared wavelength band of 1500 nm, which is used for optical communication, and this results in considerable absorption loss. Accordingly, annealing must be performed at a temperature over 1000° C. Also, high-temperature annealing raises the density of the glass film, making it possible to produce a device with excellent reliability, which will not be affected from the outside over an extended period.

However, if high-temperature annealing is performed when different materials are in contact, stress corresponding to the coefficient of thermal expansion will be generated at the places where the different materials are in contact, which is a problem in that it can lead to birefringence of the optical waveguide core. Specifically, with the second proposal, because the silicon thin film, which is a different material from the glass, is directly under the core, stress is generated by a large thermal hysteresis when the glass layer is annealed, internal stress remains in the core after the silicon thin film has been removed, and this has a significant adverse effect on the optical characteristics.

Meanwhile, a problem encountered with the technique disclosed as the first proposal shown in FIGS. 6 to 8C is that the sacrificial layer and the cladding layer cannot withstand the high-temperature annealing discussed above. The heat resistance of glass is closely related to the softening temperature of the material, and the softening temperature of glass goes down when boron or phosphorus is added. With the first proposal, an additive is used to ensure the etching selectivity of the sacrificial layer and the cladding layer. Accordingly, there is a considerable drop in the softening temperature, and it is possible that bubbles will be generated or transparency lost because of a crystal precipitation reaction in the interior or the effect of the additive during high-temperature annealing. Also, with the first proposal, because the softening temperature of the sacrificial layer or the lower cladding layer is low, the position of the optical waveguide core varies during high-temperature annealing, creating major problems such as the occurrence of transmission loss due to microbending, the occurrence of polarization dependency, and fluctuation of transmission characteristics.

In view of this, it is an object of the present invention to provide a thermo-optic phase shifter that has excellent high-temperature annealing resistance and long-term reliability, and with which there is little transmission loss, polarization dependency, or residual stress in the optical waveguide core, and to provide a method for manufacturing this thermo-optic phase shifter.

Means for Solving the Problem

The thermo-optic phase shifter according to an exemplary aspect of the invention includes: a substrate; a sacrificial layer formed above the substrate; a first cladding layer formed above the sacrificial layer and having a film density higher than that of the sacrificial layer; an optical waveguide core formed above the first cladding layer; a second cladding layer provided over the first cladding layer to cover the optical waveguide core; a heat-generating heater provided to a region of the second cladding layer directly above the optical waveguide core; and a groove formed in a side face region of the optical waveguide core and extending from the surface of the second cladding layer to the surface of the substrate.

Specifically, with the present invention, a material with a lower film density than that of the first cladding layer is used for the sacrificial layer, as a material that can withstand high temperatures as well as the cladding layers. With a material that can withstand high temperatures, the thermal characteristics (softening temperature) thereof are not determined by film density, but when removed by reaction with a material (wet or dry etching, etc.), the removal rate can be increased. Therefore, the high-temperature annealing resistance of the sacrificial layer can be maintained, while allowing the sacrificial layer to be removed preferentially and selectively at the end, and affording a thermo-optic phase shifter will low power consumption. Also, because the sacrificial layer can be formed over the entire surface of the substrate, the top of this sacrificial layer is flat, which makes it easier to form the cladding layers and affords better optical characteristics of the optical waveguide. Furthermore, a heat-blocking structure can be formed simply, by selectively removing the sacrificial layer between the substrate and the first cladding layer, via a portion where the cladding layer has been removed from the side face region of the optical waveguide core.

The method for manufacturing a thermo-optic phase shifter according to an exemplary aspect of the invention includes: forming a sacrificial layer above a substrate; forming a first cladding layer having a film density higher than that of the sacrificial above the sacrificial layer; forming an optical waveguide core above the first cladding layer; forming a second cladding layer over the first cladding layer to cover the optical waveguide core; forming a heat-generating heater in a region of the second cladding layer directly above the optical waveguide core; and forming a groove in a side face region of the optical waveguide core to extend from the surface of the second cladding layer to the surface of the substrate.

Specifically, with the present invention, a material with a lower film density than that of the first cladding layer is used for the sacrificial layer, as a material that can withstand high temperatures as well as the cladding layers, and high-temperature annealing can be performed, which means that it is possible to produce a thermo-optic phase shifter that has excellent long-term reliability, has little stress that is exerted on the optical waveguide core, and can operate at a low level of power consumption. Also, the thermo-optic phase shifter can be manufactured by forming the sacrificial layer by plasma excitation chemical vapor deposition, atmospheric pressure chemical vapor deposition, or sputtering. Of all chemical vapor deposition methods, a method of plasma excitation chemical vapor deposition and a method of atmospheric pressure chemical vapor deposition allow for easier control of the bulk density of the sacrificial layer. Also, similarly with a method of sputtering, the bulk density of the sacrificial layer can be controlled with relative ease, so it is suited to forming the sacrificial layer.

Advantageous Effects of the Invention

As described above, with the present invention, a thermo-optic phase shifter with excellent optical characteristics can be produced easily, with good control, and at a high yield. Also, the sacrificial layer and cladding layer can be formed continuously, which greatly simplifies the production process. As a result, production costs can be reduced and yield increased. Furthermore, even though the sacrificial layer of the thermo-optic phase shifter part is removed, the sacrificial layer remains in the other portions, and this sacrificial layer functions as a stress cushioning layer. Therefore, the optical waveguide formed in the device is subjected to less residual stress, and the polarization dependency caused by stress can be reduced. Also, the thermo-optic phase shifter of the present invention undergoes almost no shrinkage during high-temperature annealing, and maintains a stable structure, so a structure that has low power consumption can be formed simply and at low cost.

BRIEF DESCRIPTION OF REFERENCE NUMERALS 200 thermo-optic phase shifter
201 substrate
202 sacrificial layer
203 lower cladding layer
204 optical waveguide core
205 upper cladding layer
206 heat-generating heater
207 groove
208 resist

BEST MODES FOR CARRYING OUT THE INVENTION

Figure 1:
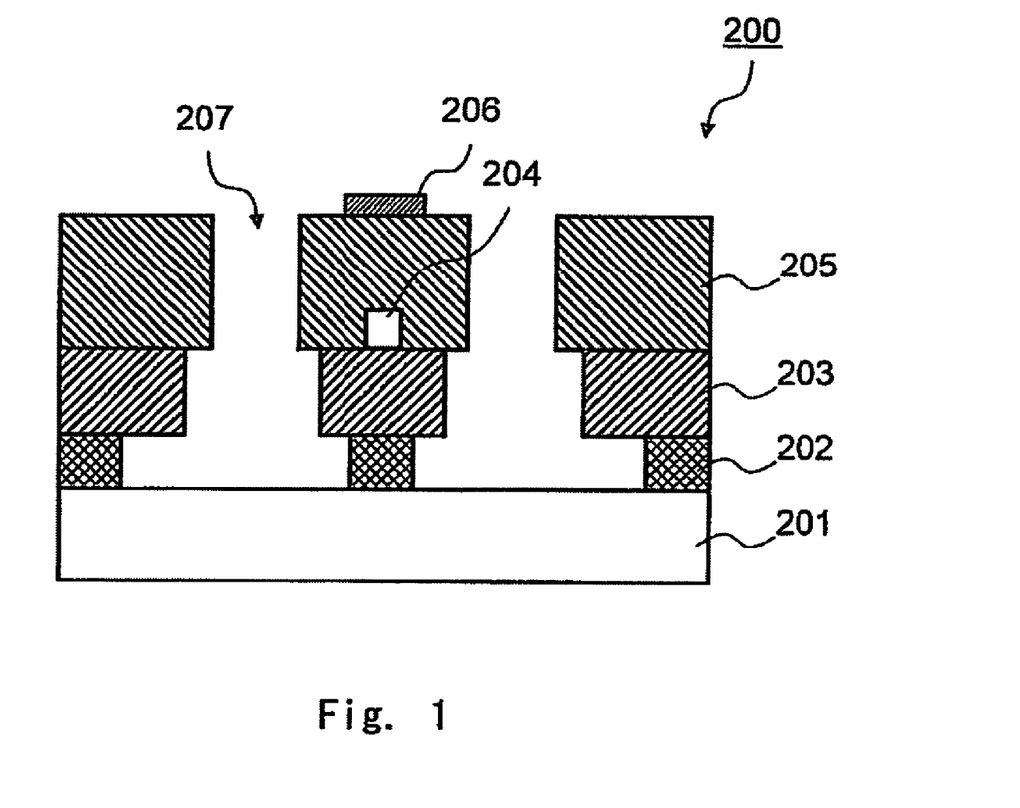
FIG. 1 is a cross section of the main components of a thermo-optic phase shifter in an embodiment of the present invention.

The present invention will now be described in detail on the basis of embodiments. FIG. 1 shows the cross sectional structure of the main components of the thermo-optic phase shifter in an embodiment of the present invention. The energy-efficient thermo-optic phase shifter 200 of this embodiment includes a substrate 201, a sacrificial layer 202 provided over this substrate 201, a lower cladding layer 203 formed on this sacrificial layer 202, an optical waveguide core 204 formed on the lower cladding layer 203, an upper cladding layer 205 provided so as to cover the optical waveguide core 204, and a heat-generating heater 206 provided in a region directly above the optical waveguide core 204. A characteristic features is that a heat-blocking structure is formed in which all or at least part of the sacrificial layer 202 in the region directly under the optical waveguide core 204, and the sacrificial layer 202 and the upper cladding layer 205 and lower cladding layer 203 in the side face region of the optical waveguide core 204, is removed via grooves 207, and the film density of the sacrificial layer 202 is lower than that of the lower cladding layer 203.

In producing this energy-efficient thermo-optic phase shifter 200, the sacrificial layer 202 initially formed on the substrate 201 must have characteristics that allow it to withstand the high-temperature annealing that is subsequently performed for forming the lower cladding layer 203 and upper cladding layer 205 and reducing transmission loss. The sacrificial layer 202 must also have characteristics that allow it to be easily removed at the end. The lower cladding layer 203 and upper cladding layer 205 obviously need to have film properties that allow it to withstand high-temperature annealing, but the sacrificial layer 202 cannot be of exactly the same material as that of the lower cladding layer 203 and the upper cladding layer 205. Accordingly, in this embodiment, the problem is solved by using for the sacrificial layer 202 a material whose film density is lower than that of the lower cladding layer 203 and the upper cladding layer 205, as a material that will stand up to high temperatures as well as the lower cladding layer 203 and the upper cladding layer 205 do. When the sacrificial layer 202 is made of a material that withstands high temperatures, its thermal characteristics (softening point) are not determined by film density, but when removed by reaction with a material (wet or dry etching, etc.), the removal rate can be increased. Therefore, the high-temperature annealing resistance of the sacrificial layer 202 can be maintained, while allowing the sacrificial layer 202 to be removed preferentially and selectively at the end, and affording a thermo-optic phase shifter will low power consumption.

Also, because the sacrificial layer 202 can be formed over the entire surface of the substrate 201, the top of this sacrificial layer 202 is flat, which makes it easier to form the lower cladding layer 203 and upper cladding layer 205 and affords better optical characteristics of the optical waveguide. Furthermore, a heat-blocking structure can be formed simply, by selectively removing the sacrificial layer 202 between the substrate 201 and the lower cladding layer 203, via a portion where the upper cladding layer 205 has been removed from the side face region of the optical waveguide core 204. As a result, a thermo-optic phase shifter with excellent optical characteristics can be produced easily, with good control, and at a high yield. Also, the sacrificial layer 202 and the lower cladding layer 203 can be formed continuously, which greatly simplifies the production process. As a result, production costs can be reduced and yield increased.

Also, with this embodiment, even though the sacrificial layer 202 of portion constituting the thermo-optic phase shifter 200 is removed, the sacrificial layer 202 remains in the other portions of the device, and this remaining sacrificial layer 202 functions as a stress cushioning layer. Therefore, the optical waveguide formed in the device is subjected to less residual stress, and the polarization dependency caused by stress can be reduced.

The bulk density of the sacrificial layer 202 (obtained by dividing mass by volume) is preferably at least $2.0 \text{ g/cm}^3$. The bulk density of ordinary silica glass is roughly $2.3 \text{ g/cm}^3$. If the bulk density is at least 90% of this value (at least $2.0 \text{ g/cm}^3$), the lower density will not result in the self-destruction of the sacrificial layer, and there will be almost no shrinkage during high-temperature annealing over 1000° C. Accordingly, a stable structure is maintained while a structure that has low power consumption can be formed.

Furthermore, the sacrificial layer 202 and the lower cladding layer 203 are preferably made of silica glass. An optical waveguide whose main material is silica glass can undergo high-temperature annealing over 1000° C., and transmission loss can be kept low. With the thermo-optic phase shifter 200, the film formation conditions in the chemical vapor deposition can be varied as desired, as can the film density under high-temperature annealing conditions, from 2.0 to 2.3 $\text{g/cm}^3$, and the sacrificial layer and the cladding layer can be formed by the same method. Therefore, the energy-efficient thermo-optic phase shifter 200 can be obtained simply and at low cost.

Also, with the thermo-optic phase shifter 200, the sacrificial layer 202 and the lower cladding layer 203 may be made from silica glass and one or more impurity materials selected from among phosphorus glass, boron glass, and germanium glass. The optical waveguide is a device formed by utilizing the difference between the refractive index of the core layer and the refractive index of the lower cladding layer 203 and upper cladding layer 205, and the refractive indexes of these must be closely controlled. Accordingly, a mixture of silica glass and an impurity for adjusting the refractive index is sometimes used for the lower cladding layer 203 and the upper cladding layer 205.

The difference in the amounts in which the impurity material is contained in the sacrificial layer 202 and the lower cladding layer 203 is preferably no more than 1 wt %. If there is a large difference in the impurity material contents, it is possible that an etching difference attributable to the impurity material content will occur in the step of removing the sacrificial layer 202, and also that there will be a difference in the high-temperature annealing. Accordingly, the materials of the sacrificial layer 202 and the lower cladding layer 203 are preferably as close as possible. If the impurity material content difference is 1 wt % or less, this difference will have almost no effect on heat resistance or etching characteristics.

Also, the amounts in which the impurity material is contained in the sacrificial layer 202 and the lower cladding layer 203 are preferably each no more than 4 wt %. This is because the softening point decreases as the impurity content is raised, so the high-temperature annealing resistance needed to prevent transmission loss cannot be obtained. If the impurity content is 4 wt % or less, high-temperature annealing resistance of 1000° C. or higher will be obtained, and it will be possible to obtain a glass material that satisfies all the requirements of a cladding layer and the function of a sacrificial layer.

The method for manufacturing this thermo-optic phase shifter 200 comprises the following steps.

(a) forming the sacrificial layer 202 above the substrate 201

(b) forming the lower cladding layer 203 having a film density higher than that of the sacrificial layer 202 above the sacrificial layer 202

(c) forming the optical waveguide core 204 above the lower cladding layer 203

(d) forming the upper cladding layer 205 to cover the optical waveguide core 204

(e) forming the heat-generating heater 206 in the region directly above the optical waveguide core 204

(f) forming a groove by removing all or at least part of the sacrificial layer 202, the upper cladding layer 205, and the lower cladding layer 203 in the side face region of the optical waveguide core 204

(g) removing the sacrificial layer 202 from the region directly under the optical waveguide core 204, via a groove 207

With this thermo-optic phase shifter 200, since high-temperature annealing can be performed, long-term reliability is excellent, the optical waveguide core is subjected to little stress, and energy-efficient operation is possible. Also, the thermo-optic phase shifter 200 can be produced by forming the sacrificial layer 202 by plasma excitation chemical vapor deposition, atmospheric pressure chemical vapor deposition, or sputtering. Of all chemical vapor deposition methods, plasma excitation chemical vapor deposition and atmospheric pressure chemical vapor deposition allow for easier control of the bulk density of the sacrificial layer 202. The same applies to sputtering, with which the bulk density of the sacrificial layer 202 can be controlled with relative ease. Accordingly, these can be considered manufacturing methods that are suited to forming the sacrificial layer 202.

Figure 2A:
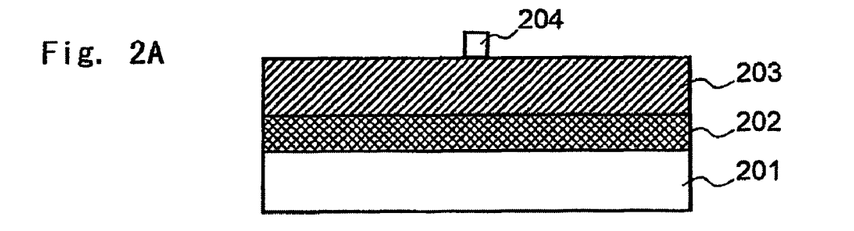
FIG. 2A is a cross section of the main components, illustrating the main points of the process for manufacturing the thermo-optic phase shifter in this embodiment.

FIGS. 2A to 2D illustrate the main points of the process for manufacturing the thermo-optic phase shifter in this embodiment. To manufacture the thermo-optic phase shifter 200, first, as shown in FIG. 2A, a sacrificial layer 202 that can withstand high temperatures over 1000° C. and has low film density (such as non-doped silica glass (NSG)) is formed on the substrate 201. A method involving plasma-enhanced chemical vapor deposition (P-CVD) will be given here as an example.

With P-CVD, film quality is controlled by means of the type of gas introduced into the film formation chamber of the CVD apparatus, which is not shown in figures, the pressure in the chamber, the temperature of the substrate 201, and the high-frequency energy for producing the plasma. Here, the film density of the non-doped silica glass (NSG) thus formed can be decreased by lowering the temperature of the substrate 201 or by raising the pressure in the chamber. Therefore, in this embodiment, the 4 μm-thick sacrificial layer 202 was formed with a film density lower than that of the lower cladding layer 203, by setting the substrate temperature during formation of the sacrificial layer 202 lower than that during formation of the lower cladding layer 203, and setting the pressure in the chamber higher.

This changing of the film density with film formation conditions is the same with sputtering and other chemical vapor deposition (CVD) methods. Therefore, obtaining a film density difference can be accomplished with relative ease with film formation methods that use other apparatus, such as a sputtering apparatus or an atmospheric CVD apparatus. However, with a given film formation method, the setting conditions can vary greatly with the apparatus manufacturer and the condition of the apparatus, so the film density, additive amount, and so forth have to be adjusted as dictated by the situation in each case.

The film density of the sacrificial layer 202 can be measured by measuring the volumetric weight, for example, but precise measurement is difficult. Accordingly, using the following method is the simplest and most effective. Specifically, with this embodiment, after the sacrificial layer 202 has been formed, non-doped silica glass (NSG) is formed, for example, as the lower cladding layer 203, which has higher film density than the sacrificial layer 202. The most important thing here is that there be a film density difference between the sacrificial layer 202 and the lower cladding layer 203. In view of this, in this embodiment, after the lower cladding layer 203 is formed, the sacrificial layer 202 is cut to make a cross section, etching is performed, and the etching rate difference is measured.

Figure 3A:
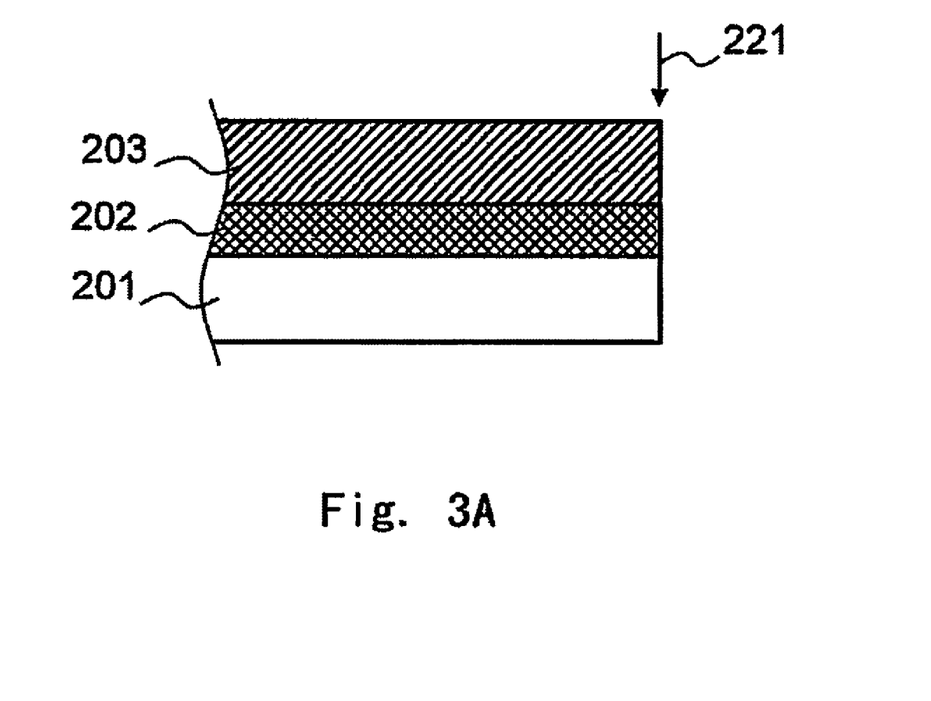
FIG. 3A is a diagram illustrating how the etching rate difference is measured.

FIGS. 3A and 3B illustrate how this etching rate difference is measured. FIG. 3A shows the state when a cross section has been made by cutting the portion where the substrate 201, the sacrificial layer 202, and the lower cladding layer 203 are laminated, in the direction of the arrow 221, perpendicular to the substrate 201. Here, the sacrificial layer 202 is composed of non-doped silica glass (NSG) with low film density, and the lower cladding layer 203 is composed of non-doped silica glass with high film density.

Figure 3B:
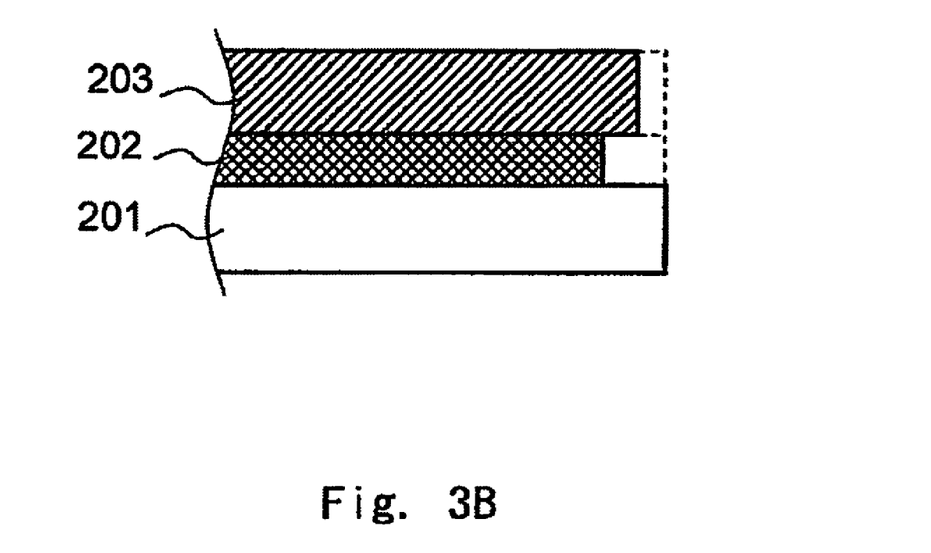
FIG. 3B is a diagram illustrating how the etching rate difference is measured.

The entire cross section is etched in the state shown in FIG. 3A. Since the etching speed is slower when the film density is lower, a step is formed between the sacrificial layer 202 and the lower cladding layer 203 in the cross section, as shown in FIG. 3B. The difference in film density can be confirmed from the extent of this step. However, as disclosed in Patent Document 4, there may be a difference in the etching rate if the difference in additives contained in the sacrificial layer 202 and the lower cladding layer 203 is too great. The amount of additive contained in a glass film can be confirmed by quantitative analysis such as SIMS (Secondary Ion Mass Spectrometry) or microarea X-ray analysis on additives contained in the sacrificial layer 202 and the lower cladding layer 203. This makes it clear whether it is the amount of additive or the film density that is determining the etching rate.

The description will now return to FIG. 2A. The sacrificial layer 202, which is resistant to high-temperature annealing, is formed in a thickness of 4 μm, and the lower cladding layer 203 is formed in a thickness of 8 μm, after which the optical waveguide core 204 composed of SiON is formed on the surface of the lower cladding layer 203. The optical waveguide core 204 is a place where the optical power is particularly concentrated, and slight variations or deformations can have a major impact on the optical transmission characteristics. Also, if a substance that causes infrared absorption (such as O—H bonds or N—H bonds) remains in the material forming the optical waveguide core 204, this can lead to an increase in transmission loss. Accordingly, high-temperature annealing of the optical waveguide core 204 is particularly important.

However, problems are encountered when, as was done in the past, silicon is used for the sacrificial layer 202, or when using a lower cladding layer 203 of BPSG or a sacrificial layer 202 of phosphorus-doped silica glass (PSG) containing a large amount of additive. For instance, when the sacrificial layer 202 is silicon, its coefficient of thermal expansion is different from that of the non-doped silica glass (NSG) that makes up the lower cladding layer 203, which means that internal stress ends up accumulating because of the difference in the amounts of shrinkage in cooling from the high-temperature annealing, in particular. As a result, birefringence is produced when the optical waveguide core 204 is subjected to external force, for example, which adversely affects the optical transmission characteristics.

And when a sacrificial layer 202 of PSG and a 203 of BPSG are used, the lower cladding layer, which is supposed to support the optical waveguide core 204, ends up being deformed because of the low melting temperature. As a result, this causes deformation in the shape of the optical waveguide core 204, which has the adverse effect of increasing transmission loss or diminishing optical transmission characteristics. Accordingly, it is essential to use a sacrificial layer 202 and a lower cladding layer 203 with excellent high-temperature annealing resistance, and a method that forms the sacrificial layer 202 with a film density difference, as in this embodiment, is effective.

Figure 2B:
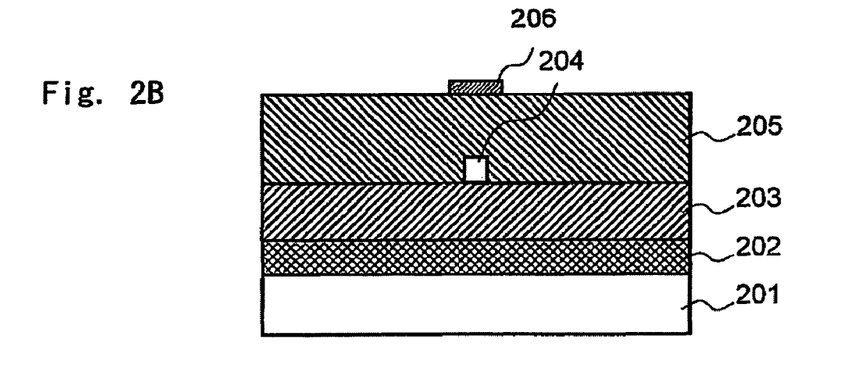
FIG. 2B is a cross section of the main components, illustrating the main points of the process for manufacturing the thermo-optic phase shifter in this embodiment.

Next, as shown in FIG. 2B, the upper cladding layer 205 is formed, and the heat-generating heater 206 is formed in the region directly over the optical waveguide core 204. The upper cladding layer 205 here does not necessarily have to be resistant to high-temperature annealing. A better embedding condition can be obtained at the vicinity of the optical waveguide core 204, if annealing causes it to deform and conform to the shape of the optical waveguide core 204, because this affords a flatter surface. Of course, glass with excellent high-temperature annealing resistance can also be used for the upper cladding layer 205. In this embodiment, boro-phospho-silicate glass (BPSG) was used, giving priority to surface flatness and good embedding characteristics. As a result, the heat-generating heater 206 could be patterned well by metal thin-film wire resistance with a lateral width of 5 μm.

Figure 2C:
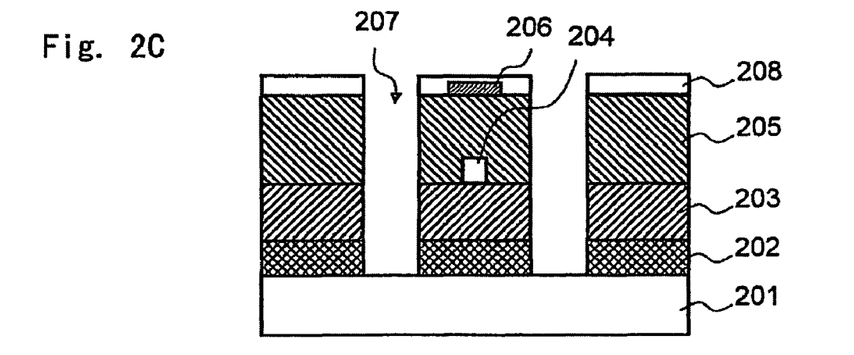
FIG. 2C is a cross section of the main components, illustrating the main points of the process for manufacturing the thermo-optic phase shifter in this embodiment.

Next, as shown in FIG. 2C, grooves 207 were formed, each at a distance of 20 μm from the center of the optical waveguide core 204, in regions on either side of the optical waveguide core 204 and directly under where the heater pattern was formed by the heat-generating heater 206. A resist 208 formed over the upper cladding layer 205 and a reactive ion etching (RIE) apparatus were used to form the grooves 207. The grooves 207 was formed from the upper cladding layer 205 down to the lowermost part of the sacrificial layer 202, and in a shape that allows uniform side etching from the sides of the sacrificial layer 202.

Figure 2D:
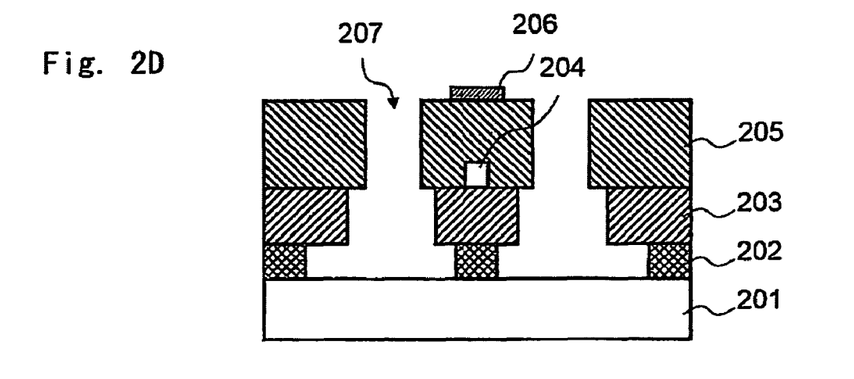
FIG. 2D is a cross section of the main components, illustrating the main points of the process for manufacturing the thermo-optic phase shifter in this embodiment.

Wet etching is suited to the side etching depicted in FIG. 2D. In particular, a buffered hydrogen fluoride aqueous solution (BHF) is ideal for the non-doped silica glass (NSG) that is formed as the sacrificial layer 202 in this embodiment. In this embodiment as well, the sacrificial layer 202 was etched using the buffered hydrogen fluoride aqueous solution (BHF). The etching rate ratio of the sacrificial layer 202 with respect to the lower cladding layer 203 was 1.5 times in this embodiment. The etching was designed to leave part of the sacrificial layer 202 behind, so as to maintain the strength of the heat-blocking structure. The sacrificial layer 202 was side etched by 15 μm from both sides of the grooves 207, the lower cladding layer 203 was etched by 10 μm in each direction, and the upper cladding layer 205 was etched by 5 μm in each direction. The width of the remaining sacrificial layer 202 was 10 μm, the width of the lower cladding layer 203 was 20 μm, and the width of the upper cladding layer 205 was 30 μm.

Figure 4:
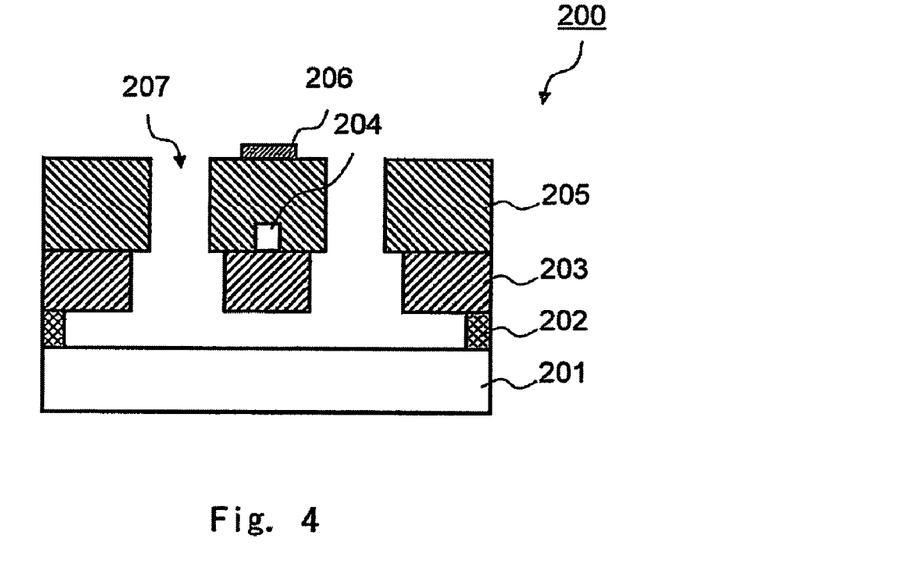
FIG. 4 is a cross section of the main components, illustrating an example of removing all of the sacrificial layer directly under the optical waveguide core in this embodiment.

FIG. 4 illustrates an example of removing all of the sacrificial layer directly under the optical waveguide core. Thus, unlike in FIG. 2D, it is possible to remove all of the sacrificial layer 202 directly under the optical waveguide core 204.

Next, the power consumption of an optical switch employing the thermo-optic phase shifter 200 manufactured by the process shown in FIGS. 2A to 2D will be described. The power consumption of an optical switch is defined as the amount of power required to switch the contact on and off, that is, the amount of power required for the phase change to be π (rad).

As shown in FIG. 2B, when there were no grooves 207 or etching of the sacrificial layer 202, the power consumption was 400 mW. When the grooves 207 were formed as shown in FIG. 2C, the power consumption of the optical switch dropped to 200 mW. Furthermore, as shown in FIG. 2D, when the sacrificial layer 202 was etched and the structure of this embodiment was employed, the power consumption of the optical switch dropped to 100 mW. Thus, the power consumption of an optical switch can be cut in half compared to when the grooves 207 are merely formed.

The result of the above measures was that there was little polarization dependency even with an optical circuit in the portion where no heat-blocking structure had been formed, and the effect of the low-density sacrificial layer 202 could be confirmed. Consequently, it is possible to produce a favorable optical device that satisfies requirements for low loss, low power consumption, low polarization dependency, and good long-term reliability.

The power consumption can be cut even further by adopting measures such as increasing the thickness of the sacrificial layer 202, reducing the distance between the grooves 207, reducing the width of the sacrificial layer 202, or removing all of the sacrificial layer 202 as shown in FIG. 4. For example, when everything is the same as in the embodiment illustrated in FIG. 2D, in which the width of the upper cladding layer 205 after etching of the sacrificial layer 202 was 30 μm and the width of the lower cladding layer 203 was 20 μm, and when all of the sacrificial layer 202 is removed from the region directly under the optical waveguide core 204 as shown in FIG. 4, the power consumption of the optical switch can be reduced to 40 mW or less.

With the embodiment described above, BPSG (glass doped with boron and phosphorus) was used for the upper cladding layer 205, but the present invention is not limited to this, and it is also possible to use high-density non-doped silica glass (NSG). Usually, BPSG is etched more slowly than high-density NSG with buffered hydrogen fluoride aqueous solution (BHF). This means that the upper cladding layer ends up having a greater width, as shown in FIG. 1, which leads to a decrease in thermal resistance of the heat-blocking portion and an increase in thermal capacity, and has somewhat of an adverse effect on operating speed and efforts to reduce power consumption. Therefore, as long as there is no effect on the light propagating through the optical waveguide core 204, it is preferable for the upper cladding layer 205 and the lower cladding layer 203 to have the same width and to be as narrow as possible.

Figure 5:
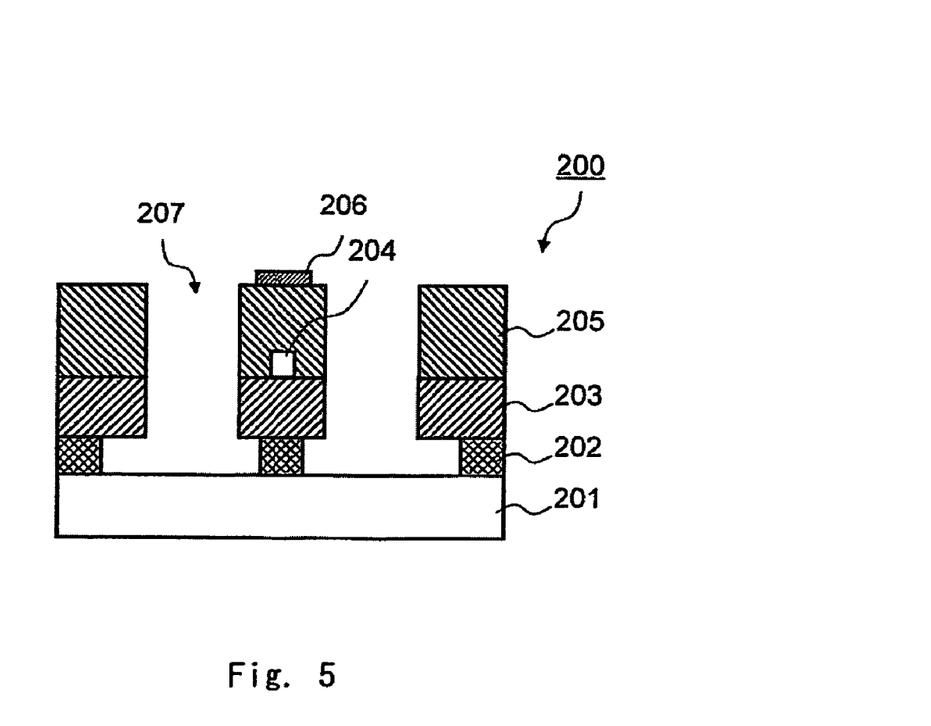
FIG. 5 is a cross section of the main components, illustrating an example of the main components of a thermo-optic phase shifter in which high-density NSG is used for the upper cladding layer in this embodiment.

FIG. 5 shows the main components of a thermo-optic phase shifter in which high-density NSG is used for the upper cladding layer. Thus using high-density NSG for the upper cladding layer 205 allows the upper cladding layer 205 and the lower cladding layer 203 to have the same width. In this case, the upper cladding layer 205 can undergo high-temperature annealing just as can the lower cladding layer 203. Accordingly, an optical waveguide with less loss and excellent long-term reliability can be produced.

Furthermore, using high-density NSG for the upper cladding layer 205 means that even if high-temperature annealing is performed, there will be no effect on the flatness of the surface of the upper cladding layer 205 obtained from BPSG. Accordingly, there will still be some adverse effect on the fine patterning. However, on the other hand excellent heat-blocking characteristics can be obtained and power consumption can be reduced. For instance, in the example shown in FIG. 5, if the upper cladding layer 205 and the lower cladding layer 203 are both 20 μm wide, and the remaining sacrificial layer width is 10 μm, the power consumption of the optical switch will be about 85 mW, affording a further reduction in power consumption of approximately 15%.

The specific numerical values after design and manufacture given in the embodiment described above are intended as nothing more than examples. Therefore, the width and thickness can be increased or decreased according to the design of the optical waveguide or the required structure. Specifically, it is important to design structure parameters according to the required switching speed, the wavelength, and the difference in refractive index between the optical waveguide core 204 and the upper cladding layer 205 and lower cladding layer 203. In any case, the present invention contributes greatly to reducing power consumption, transmission loss, and polarization dependency.

INDUSTRIAL APPLICABILITY

The present invention is utilized, for example, in optical devices such as wavelength filters, variable attenuators, and switches that make use of phase changes produced by thermo-optic effect.

What is claimed is:
1. A thermo-optic phase shifter, comprising:
a substrate;
a sacrificial layer formed above the substrate;
a first cladding layer formed above the sacrificial layer and having a film density higher than that of the sacrificial layer;
an optical waveguide core formed above the first cladding layer;
a second cladding layer provided over the first cladding layer to cover the optical waveguide core;
a heat-generating heater provided to a region of the second cladding layer directly above the optical waveguide core; and
a groove formed in a side face region of the optical waveguide core and extending from the surface of the second cladding layer to the surface of the substrate, wherein a bulk density of the sacrificial layer is at least 2.0 g/cm$^3$.

2. The thermo-optic phase shifter according to claim 1, wherein the sacrificial layer and the first cladding layer are made from silica glass.

3. The thermo-optic phase shifter according to claim 1, wherein the sacrificial layer and the first cladding layer are made from silica glass and at least one impurity material from among phosphorus glass, boron glass, and germanium glass.

4. The thermo-optic phase shifter according to claim 3, wherein a difference in contents of the impurity material between the sacrificial layer and the first cladding layer is not more than 1 wt %.

5. The thermo-optic phase shifter according to claim 3, wherein the contents of the impurity material in the sacrificial layer and the first cladding layer are each not more than 4 wt %.

6. A method for manufacturing a thermo-optic phase shifter, comprising:
    forming a sacrificial layer above a substrate;
    forming a first cladding layer having a film density higher than that of the sacrificial above the sacrificial layer;
    forming an optical waveguide core above the first cladding layer;
    forming a second cladding layer over the first cladding layer to cover the optical waveguide core;
    forming a heat-generating heater in a region of the second cladding layer directly above the optical waveguide core; and
    forming a groove in a side face region of the optical waveguide core to extend from the surface of the second cladding layer to the surface of the substrate,
    wherein a bulk density of the sacrificial layer is at least 2.0 g/cm$^3$.

7. The method for manufacturing a thermo-optic phase shifter according to claim 6, wherein the sacrificial layer is formed using a method of plasma enhanced chemical vapor deposition, a method of atmospheric pressure chemical vapor deposition, or a method of sputtering.

8. The method for manufacturing a thermo-optic phase shifter according to claim 6, wherein the forming the groove comprises:
    forming a vertical groove by using a reactive ion etching apparatus to etch from the second cladding layer to the lowermost part of the sacrificial layer; and
    performing side etching by a wet etching method on the vertical groove after the forming the vertical groove.

* * * * *